United States Patent [19]

Stein

[11] 4,117,742
[45] Oct. 3, 1978

[54] PERMANENT AUTOMATIC ROTOR BALANCER FOR SHAFTS OPERATING ABOVE CRITICAL SPEED

[76] Inventor: Philip C. Stein, 20th St. & Indiana Ave., Philadelphia, Pa. 19132

[21] Appl. No.: 820,295

[22] Filed: Jul. 29, 1977

[51] Int. Cl.$^2$ .......................... F16H 3/44; F16H 57/10
[52] U.S. Cl. ................................. 74/573 R; 74/573 F
[58] Field of Search .................. 74/573 R, 5 R, 523 F

[56] References Cited

U.S. PATENT DOCUMENTS

| 2,659,243 | 11/1953 | Darrieus | 74/537 F |
| 3,410,154 | 11/1968 | Deakin | 74/573 R |
| 4,002,086 | 1/1977 | Reinhall | 74/573 F |
| 4,019,392 | 4/1977 | Zamfirescu | 74/5.6 E |
| 4,060,009 | 11/1977 | Wyman | 74/573 R |

Primary Examiner—Leonard H. Gerin
Attorney, Agent, or Firm—Harding, Earley & Follmer

[57] ABSTRACT

A pair of balancing weights are mounted on opposite sides of the center line of the rotor for movement about the axis of the rotor. The weights are automatically locked against movement about the axis of the rotor when the rotor is rotating below critical speed and automatically released for free movement about the axis of the rotor when the rotor is rotating above critical speed. The weights are exemplified as roller cages. The balancing weights are variously locked by mechanical clutches actuated at critical speed. The clutching for the weights is either individual or such that the weights are necessarily locked against movement and released simultaneously. Centrifugal force is used to control the clutches.

14 Claims, 13 Drawing Figures

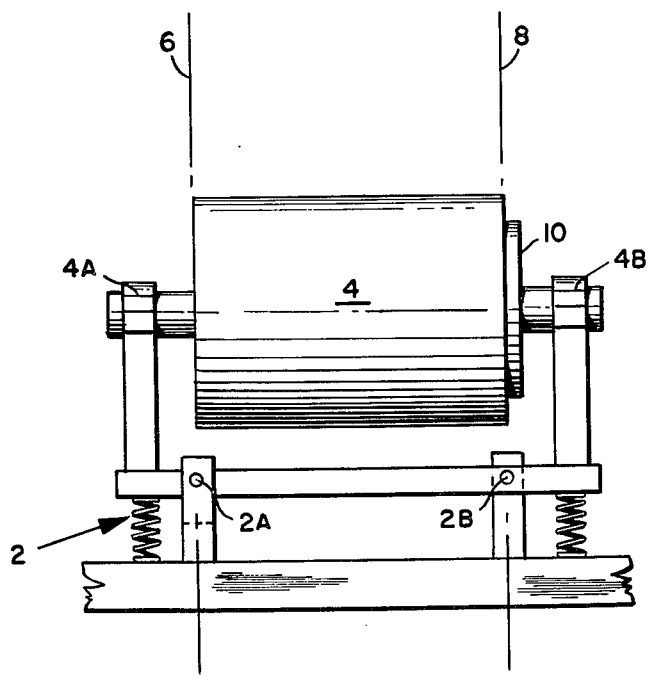
FIG. 1.
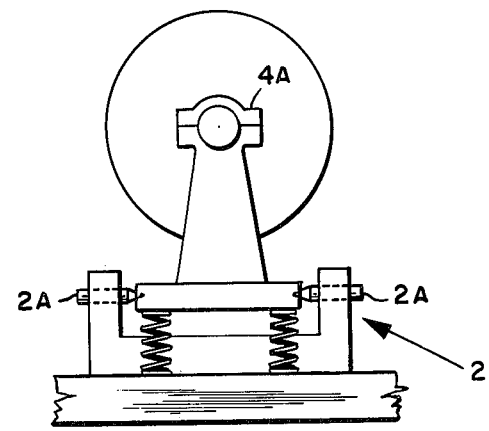
FIG. 2.
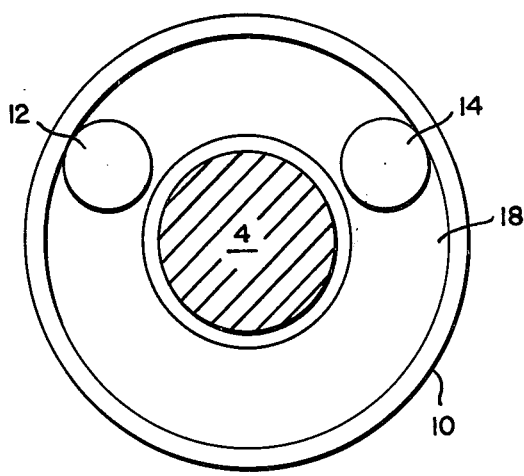
FIG. 3.
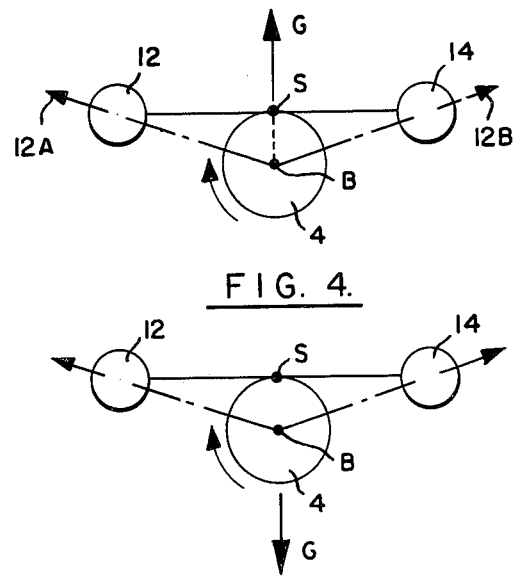
FIG. 4.
FIG. 5.

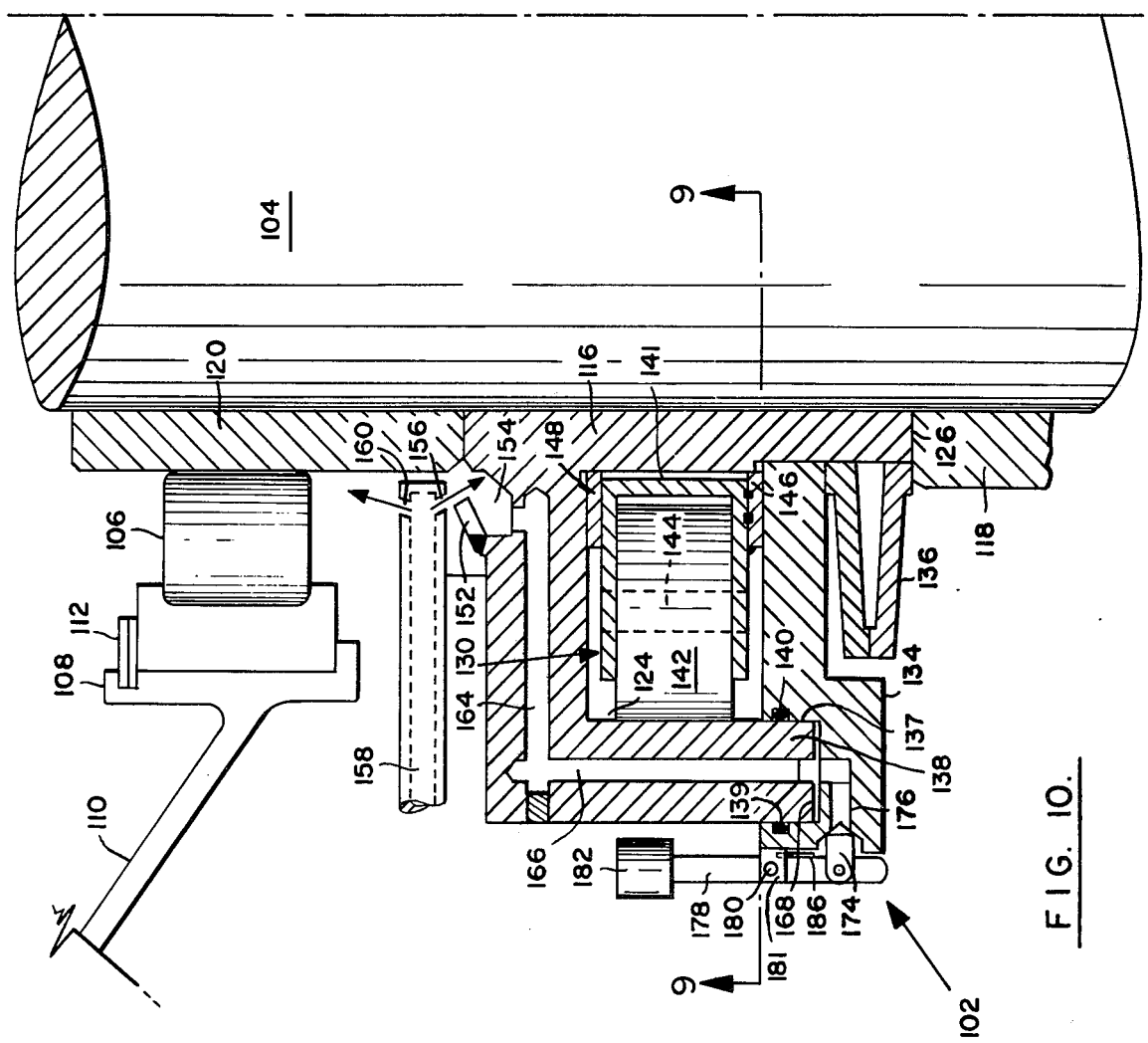

PERMANENT AUTOMATIC ROTOR BALANCER FOR SHAFTS OPERATING ABOVE CRITICAL SPEED

BACKGROUND OF THE INVENTION

Many high speed rotating rotors, such as those on jet aircraft engines operate at speeds in excess of their resonant speeds, that is, above critical speed. Inasmuch as rotors for jet aircraft engines are required to be of light weight and are built up of numerous parts bolted together at thin flanges, they are relatively flexible. Furthermore, since the rotors carry the blading for the compressor turbine or fan sections, all of which are thin flexible members subject to erosion and edge fragmentation, the vibration of such rotors can become a serious problem.

Efforts to ameliorate this problem often consist of flexibly mounting the shaft bearings, which may be of roller and ball bearing types. Such mountings may be structurally elastic or the resiliency may be achieved by surrounding the outer bearing race by an oil cushion of small thickness, ranging from 2 to about 20 mil-inch. This oil cushion allows the bearing race to deflect, the oil offering flow resistance by virtue of its viscosity. This type of device acts as an energy absorber and therefore reduces the amplitude of vibration of the shaft.

Despite such means, many high speed engine rotors experience considerable trouble, including the rubbing of blade tips and possible bending and loss of blade tips due to large vibratory deflection. There have been repeated instances with some engines where the loss of part of a blade has so unbalanced the shaft that all the blades in a section of the engine were destroyed and, in some cases, the entire turbine rotor of the engine was torn loose and dropped from the airborne plane.

In 1930, a balancing machine for determining the unbalance in rotors of machines was invented by E. L. Thearle (reference may be made to Thearle, E. L.: A new type of dynamic Balancing Machine ASME, 1932, Paper APM-54–12). The machine had a spring-mounted bed 2 which supported a rotor 4 (FIG. 1) mounted in bearings 4A and 4B. The bed could be locked against motion in two spaced planes indicated by lines 6 and 8 by pivot pins in both sides of the bed at 2A or 2B. Determination of the degree of unbalance was accomplished by use of a balancing head 10, which was solidly coupled to the rotor and had two balls 12 and 14 (FIG. 3) mounted in a race 18 whose axis was colinear with that of the rotor 4. The balls were held from moving from their positions in the race by a spring loaded clutch not shown. The clutch could be removed from the balls by manually depressing the spring. A cycle of operation involves: (a) initial positioning of the balls 12 and 14 so that they are diametrically opposite each other and permitting motion of the bed in plane 8 by removing the pins at 2B; (b) rotating and increasing the speed of the rotor 4 to beyond the critical speed with head 10 in plane 8; (c) releasing the clutch and allowing the balls 12 and 14 to shift position; (d) restoring the clutch to lock the balls 12 and 14 in that position; (e) reducing speed and stopping rotation. When the rotor is brought to rest, inspection of the position of the balls 12 and 14 allows the magnitude and direction of the unbalance to be estimated, that is, the amount and location of correction weights in plane 8 can be determined. Replacing the pins at 2B, removing them at 2A and fastening the balancing head at plane 6 will allow the same procedure to be followed so that weight correction can be made at plane 6. Dynamic balancing of the rotor is thus completed.

The following discussion will clarify the operation of the balancing head 10. It is well known that in an unbalanced rotating shaft subjected to a centrifugal force rotating at shaft velocity below critical speed and with a low magnitude of damping, the displacement of the shaft due to the load is in phase with the load, that is, the direction of the load and the direction of the displacement which it causes rotate in the same radial plane. It is also well known that as the rotational velocity is increased to beyond critical, the phase angle between the direction of the force and the displacement becomes 180°. Thus, above critical speed the displacement is opposite the heavy side of the shaft. With forced vibrations and with a single degree of freedom unbalance, the equation for the phase angle is given by $$\tan \phi = \frac{2 \frac{C}{C_c} \cdot \frac{W}{W_n}}{1 - \left(\frac{W}{W_n}\right)^2},$$

wherein:
- $\phi$ is the phase angle between the direction of the unbalanced force and the direction of the displacement;
- C is the damping constant, that is, the proportionality factor, which, when multiplied by the rate of displacement, expresses the magnitude of a damping force acting opposite to the direction of the velocity of the displacement;
- $C_c$ is the critical damping constant, that is, the value of the damping constant which inhibits vibratory motion;
- W is the angular velocity of shaft rotation;
- $W_n$ is the angular velocity at the natural frequency of the shaft.

Calculated values of the displacement angle $\phi$, based on the above equation and using low values of damping are plotted on FIG. 6 to illustrate the shift in displacement angle as the shaft speed approaches and exceeds its natural frequency. Lines 20, 22 and 24 are plots of phase angle against ($W/W_n$) using values of 0, 0.02 and 0.05 respectively for ($C/C_c$).

In FIG. 4 the force and displacement conditions are illustrated for rotational velocities of the rotor 4 under the natural frequency. The point B represents the center axis of the bearing and S represents the center axis of the rotor 4. The distance between S and B is the displacement of the rotor under the action of the unbalanced load G. The centrifugal load G represented by an arrow and the displacement of S from B have the same direction. The system 12-S-14 and G orbit about B. The centrifugal forces on balls 12 and 14 are as indicated by the arrows 12A and 12B passing through them. If the balls are released, the tangential components of the centrifugal force drive the balls to the heavy side of the rotor as indicated by G, and increase the unbalance.

When the rotor speed exceeds the natural frequency, the displacement of S with respect to B is opposite to the direction of G as indicated in FIG. 5. Under these conditions, the centrifugal force on the balls 12 and 14 will urge them away from the direction of G and in the direction which will reduce the vibration. The weights cannot permanently overshoot the proper balancing condition, for if they should go beyond the proper location, the unbalance of the complete system, that is rotor plus weights will always shift the direction of the displacement so that it is opposite the direction of weight unbalance and the weights will shift to bring the system into balance.

Whereas balancing devices of the Thearle type have been used to test and correct the dynamic balance of rotors, they have not been used as permanent devices on rotors to immediately correct unbalance which might arise adventitiously during operation and thus avoid extensive damage due to vibration. The present invention is distinguished from Thearle by being a permanent device to automatically correct unbalance immediately as it may occur in rotors operating above critical speed. It is also distinguished in that the corrected balance is automatically maintained whenever the rotor speed is lowered to below critical speed. To accomplish this purpose, the balancing weights are held, fixed in position, whenever the rotor speed is below critical speed and the balancing weights are maintained completely free whenever the rotor speed is beyond some small increment above critical speed. This is accomplished automatically by a speed-dependent clutch device which may be actuated, for example, by mechanical, hydraulic or electrical means, none of which is taught by Thearle. In addition the invention involves novel weight structures not taught by Thearle.

BRIEF SUMMARY OF THE INVENTION

A pair of balancing weights are mounted on opposite sides of the center line of the rotor for movement about the axis of the rotor. An automatically actuated clutch locks the weights against movement about the axis of the rotor when the rotor is rotating below critical speed and automatically releases the weights for free movement about the axis of the rotor when the rotor is rotating above critical speed. The balancing weights are exemplified as roller cages. The clutching for the weights is either individual or such that the weights are necessarily locked against movement and released simultaneously. Centrifugal force is used to control the clutches.

BRIEF DESCRIPTION OF THE DRAWINGS

FIG. 1 is a diagrammatic showing of a test set-up used to dynamically balance a rotor;

FIG. 2 is an end view of the set-up of FIG. 1;

FIG. 3 is a diagrammatic elevational view of a balancing head employed in the set-up of FIG. 1;

FIG. 4 is a schematic view illustrating the operation of balancing weights below critical speed;

FIG. 5 is a schematic view illustrating the operation of balancing weights above critical speed;

FIG. 10 is a vertical section taken on the plane indicated by the line 10—10 in FIG. 9;

DETAILED DESCRIPTION

Figure 6:
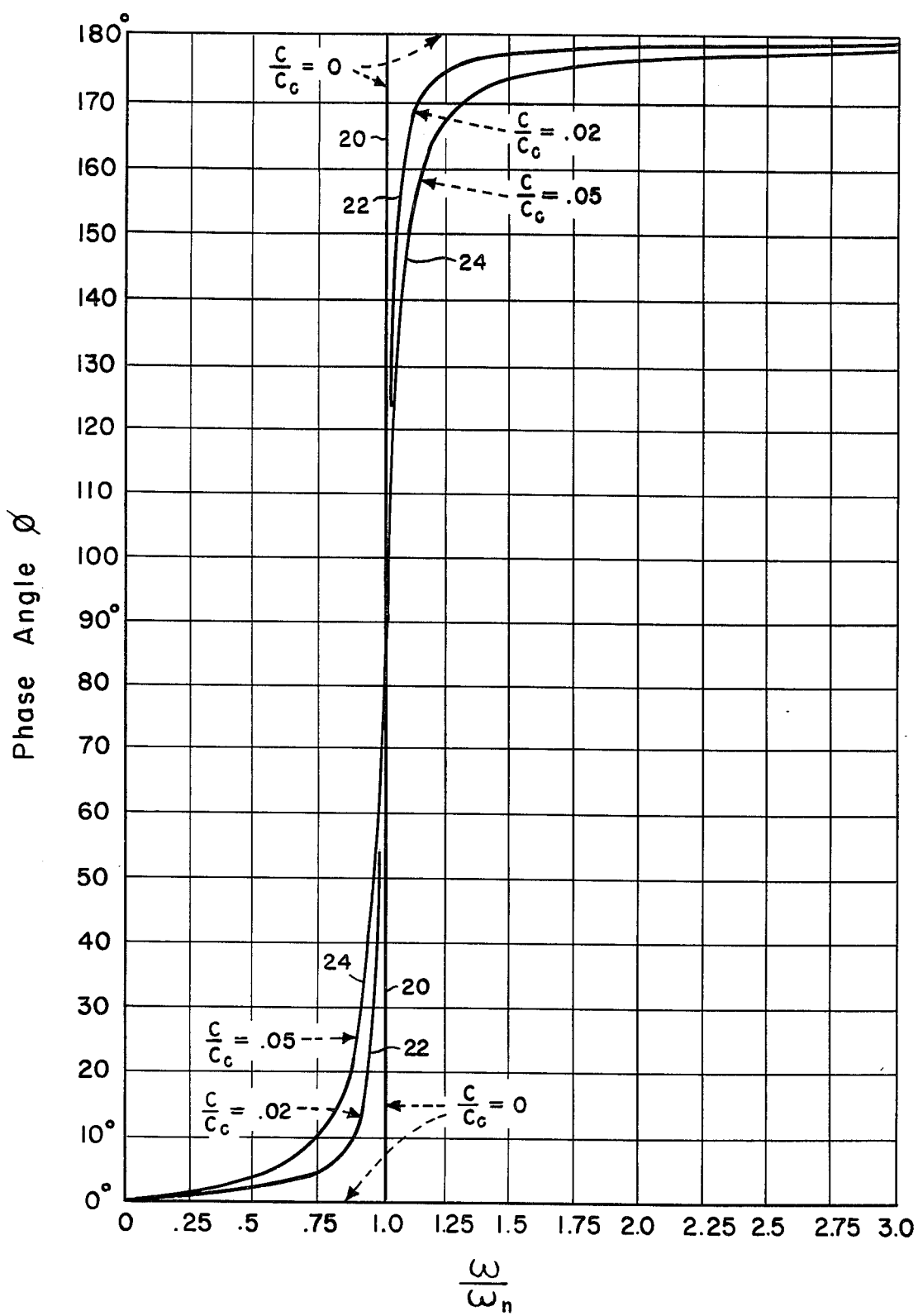
FIG. 6 is a plot illustrating the shift in the phase angle between the direction of an unbalanced force and the direction of rotor displacement as rotor speed approaches and exceeds its natural frequency based on typical low values of damping.
Figure 8:
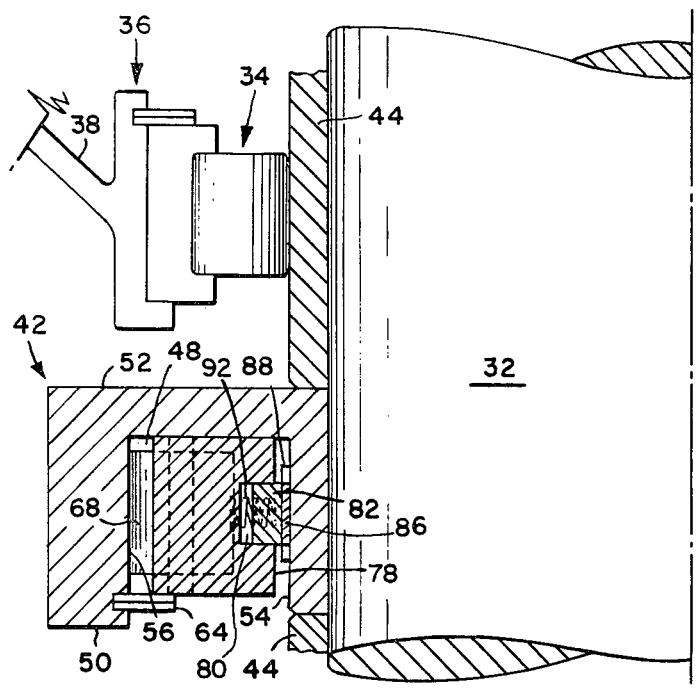
FIG. 8 is a vertical section taken on the plane indicated by the line 8—8 of FIG. 7.
Figure 7:
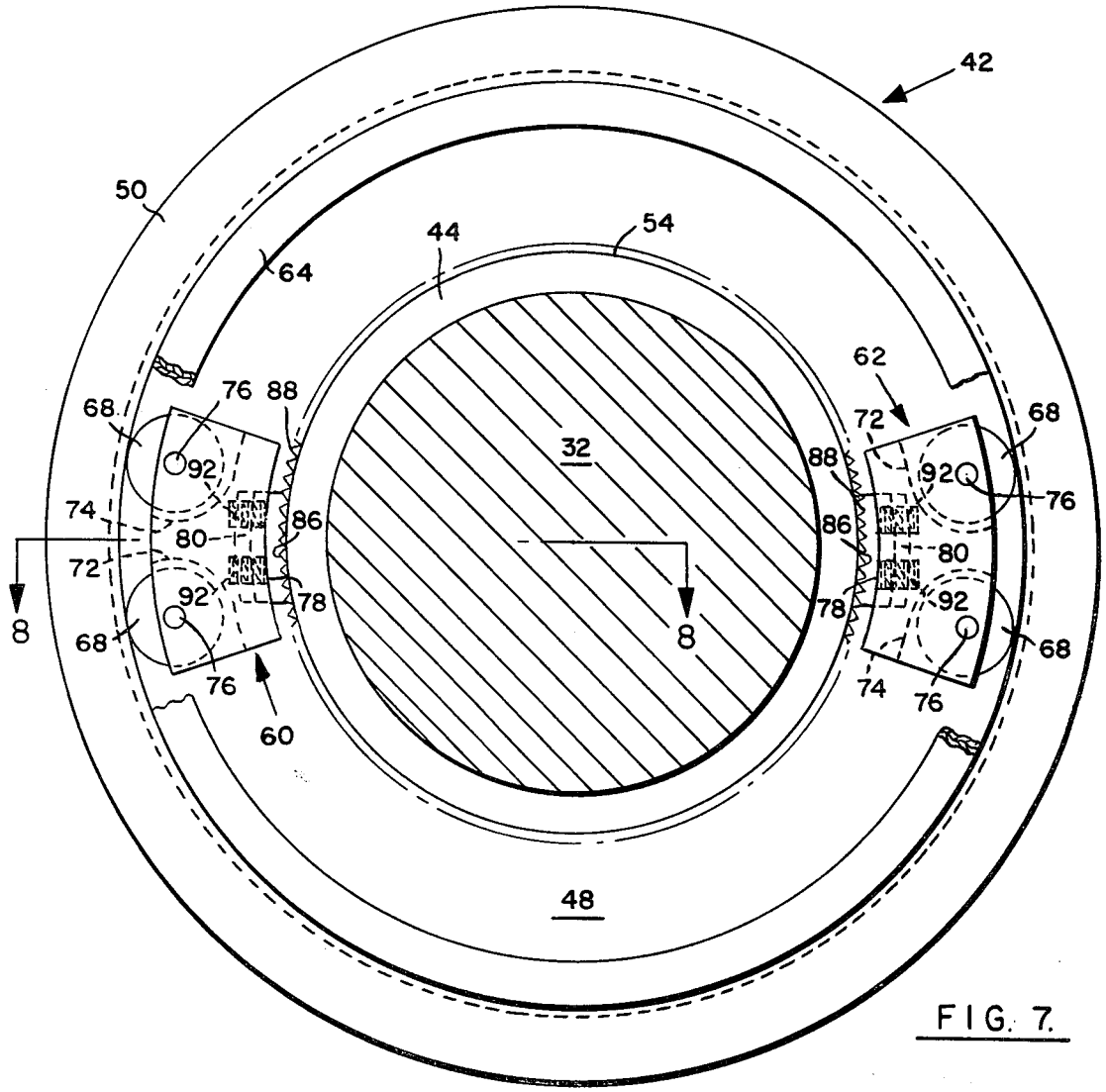
FIG. 7 is a vertical section through a rotor showing a rotor balancing device in accordance with the invention.

A balancing device in accordance with the invention is shown in FIGS. 7 and 8 in connection with a rotor 32 which turns in bearing 34 held in bearing mount 36 with part of a casing 38 enclosing the rotor. The device has an annular housing 42 fixed to rotor 32 by clamping sleeves 44 or other suitable means and rotates with it. The housing 42 has an annulus 48 open on the front face 50 of housing 42 as shown in FIG. 8, but closed on the opposite face 52 and on its inner and outer arcuate boundaries 54 and 56. Within the annulus are two identical roller cages 60 and 62 which are retained within the annulus by a suitable retaining ring 64. The roller cages contain rollers 68 which are free to move about the axis of rotor 32. The cages and rollers 68 act as balancing weights and the rollers transmit the centrifugal forces of the cages and of the rollers when the rotor 32 is rotating to the outer cylindrical surface 56 of the annulus 48. Each roller cage 60 and 62 is a block having a pair of recesses 72, 74 each accommodating a roller 68 with each roller mounted to roll on a pin 76 secured to the cage. Each roller cage 60 and 62 has an inner arcuate face 78 and a recess 80 therein containing a brake block 82 which has an arcuate surface with serrations 86 adapted to engage serrations 88 extending around the inner arcuate surface 54 of the annulus in housing 42. Serrations 86 are forced into engagement with serrations 88 by compression coil springs 92. Springs 92 are designed to act with such force that engagement of the serrations is maintained until the rotor speed goes above the critical speed, at which time the centrifugal force on brake blocks 82 exceeds the spring force and the serrations 86 disengage from serrations 88, allowing the roller cages 60 to move circumferentially within the annulus of housing 42 to effect balancing of the rotor 32 at the plane of the device as hereinbefore described. When the speed of rotor 32 slows to the critical speed, the springs 92 force brake blocks 82 inwardly overcoming the centrifugal force and engaging serrations 86 with serrations 88 to lock roller cages 60 and 62 in position so that they will act to balance rotor 32 when rotating below critical speed rather than causing a further rotor unbalance as would occur if they were permitted to remain free.

Figure 9:
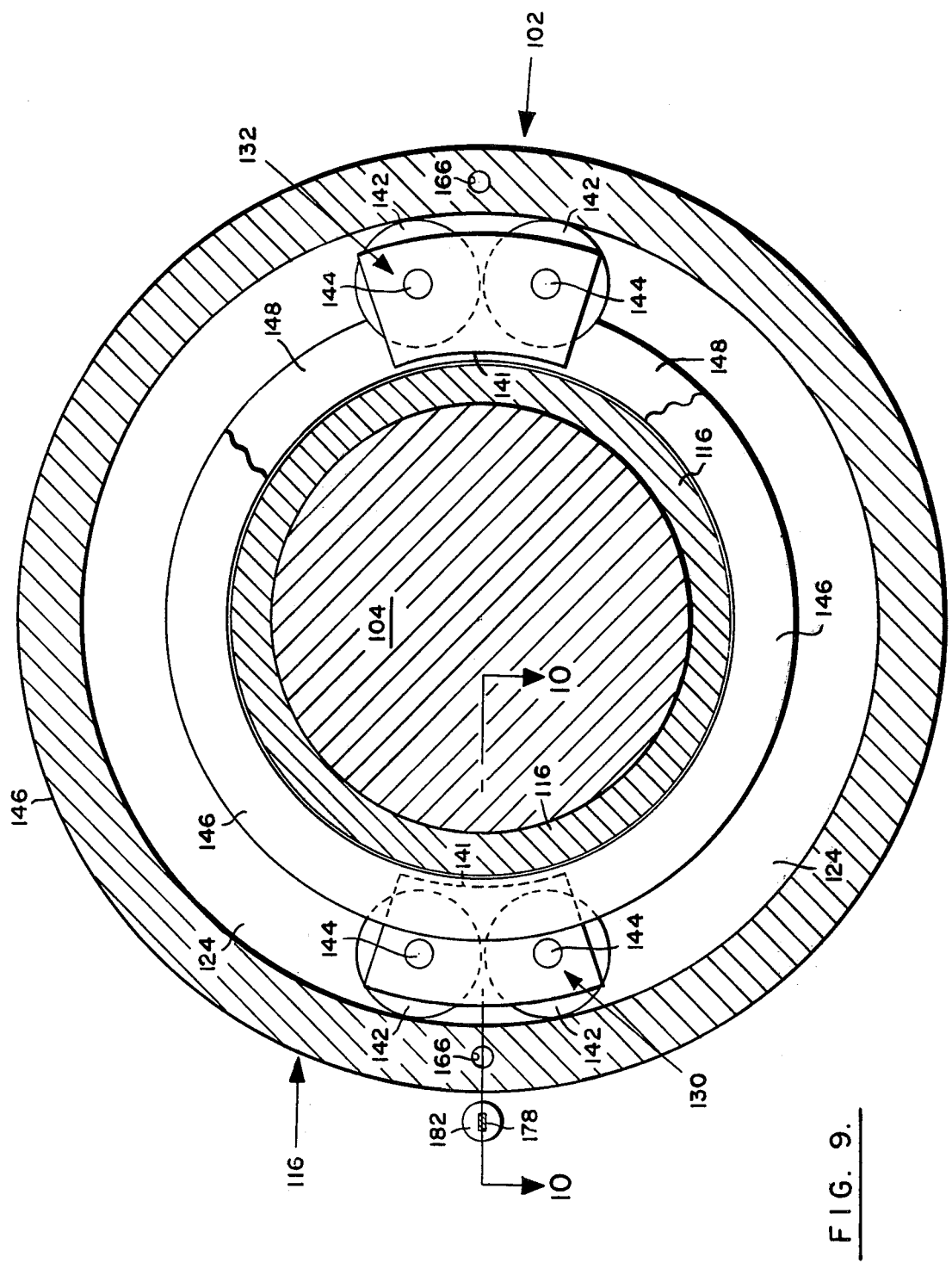
FIG. 9 is a vertical section through a rotor showing an alternative rotor balancing device.

The use of a separate clutch on each roller cage requires that the springs and the weights be carefully designed and adjusted so that the two roller cages will be released and reclutched simultaneously. To avoid the need for such careful adjustment, the roller cages can be arranged so that neither can move unless both are free to move as shown in an alternative balancing device 102 (FIGS. 9 and 10). Device 102 has a rotor 104 carried by bearing 106 in bearing mount 108 integral with casing 110. A retaining ring 112 holds bearing 106 in mount 108. A housing 116 is firmly clamped on shaft 104 by clamping sleeves 118 and 120 and turns with it. Housing 116 contains an annulus 124 open on the front face 126 as seen in FIG. 10. Within the annulus are two "U" shaped cages 130 and 132 inside of annular plate 134 biased inwardly by Belleville spring 136. Plate 134 has an annular groove 137 telescoped over annular portion 138 of housing 116 and is provided with seal rings 139 and 140 for sealing between plate 134 and portion 138. Each cage has an arcuate inner surface 141.

Each of the cages 130 and 132 is fitted with a pair of rollers 142, each attached to the cage by a shaft 144. Two flat rings 146 and 148 are situated one on each side of cages 130 and 132, ring 146 being attached to cage 130 as by welding but not to cage 132 and ring 148 being attached to cage 132 as by welding but not to cage 130. The force exerted by spring 136 on plate 134 is supported at each of the cages 130 and 132 by being transmitted through ring 146, then through the cages and then through the ring 148 to the adjacent wall of annulus 124. Therefore, neither cage can be moved until both cages and rings are released due to the friction between spring 136 and sleeve 118.

As seen in FIG. 10 the housing 116 is shown with a lip 152 near its inner diameter forming a circumferential trough 154 which can receive a jet of oil from an opening 156 in pipe 158 used to provide oil for the bearing 106 through opening 160. The oil from opening 156 is caught in trough 154 when the shaft is rotating and is fed by centrifugal force into passages 164, 166 and 176 and into space 168 between housing 116 and plate 134.

A valve 174 controlling passage 176 is pivoted to arm 178 which in turn is pivoted on pin 180 in support 181 and carries a weight 182. A leaf spring 186 mounted in support 181 opposes the centrifugal force on weight 182 and at rotor speeds below critical speed keeps the valve 174 open permitting oil to flow from passage 176 into casing 110.

As the shaft speed increases, the centrifugal force on weight 182 increases until, when critical speed is exceeded, the force of leaf-spring 186 is exceeded and valve 174 closes. Oil from opening 156 then fills passages 164 and 166 and space 168 and, because of the centrifugal force exerted on the oil in passage 164, pressure is created in space 168. At this time, the oil pressure in space 168 overcomes the force of Belleville spring 136 and moves plate 134 away from ring 146. Thereupon, the cages 130 and 132 are free to move and can assume such positions as will counteract any unbalance in the rotor 104. Inasmuch as the hydraulic pressure is only exerted upon the closing of the valve 174, the precise value of the hydraulic pressure is of little importance, so long as it exceeds the force of spring 136. Furthermore, the precise value of the force of spring 136 is not important so long as it is adequate to prevent motion of the cages 130 and 132 when valve 174 is open. Therefore, the only sensitive parts of the system are the valve 174, weight 182 and spring 186.

Figure 12:
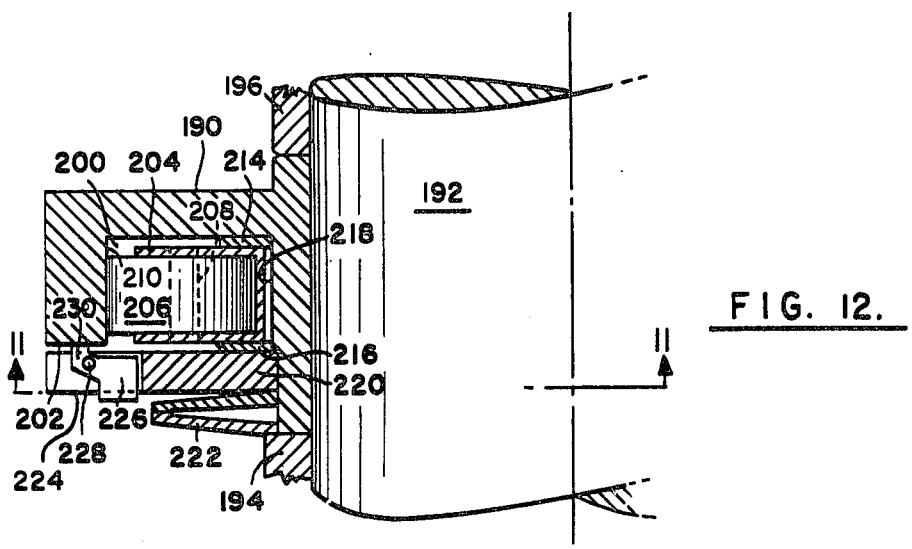
FIG. 12 is a vertical section taken on the plane indicated by the line 12—12 in FIG. 11.
Figure 11:
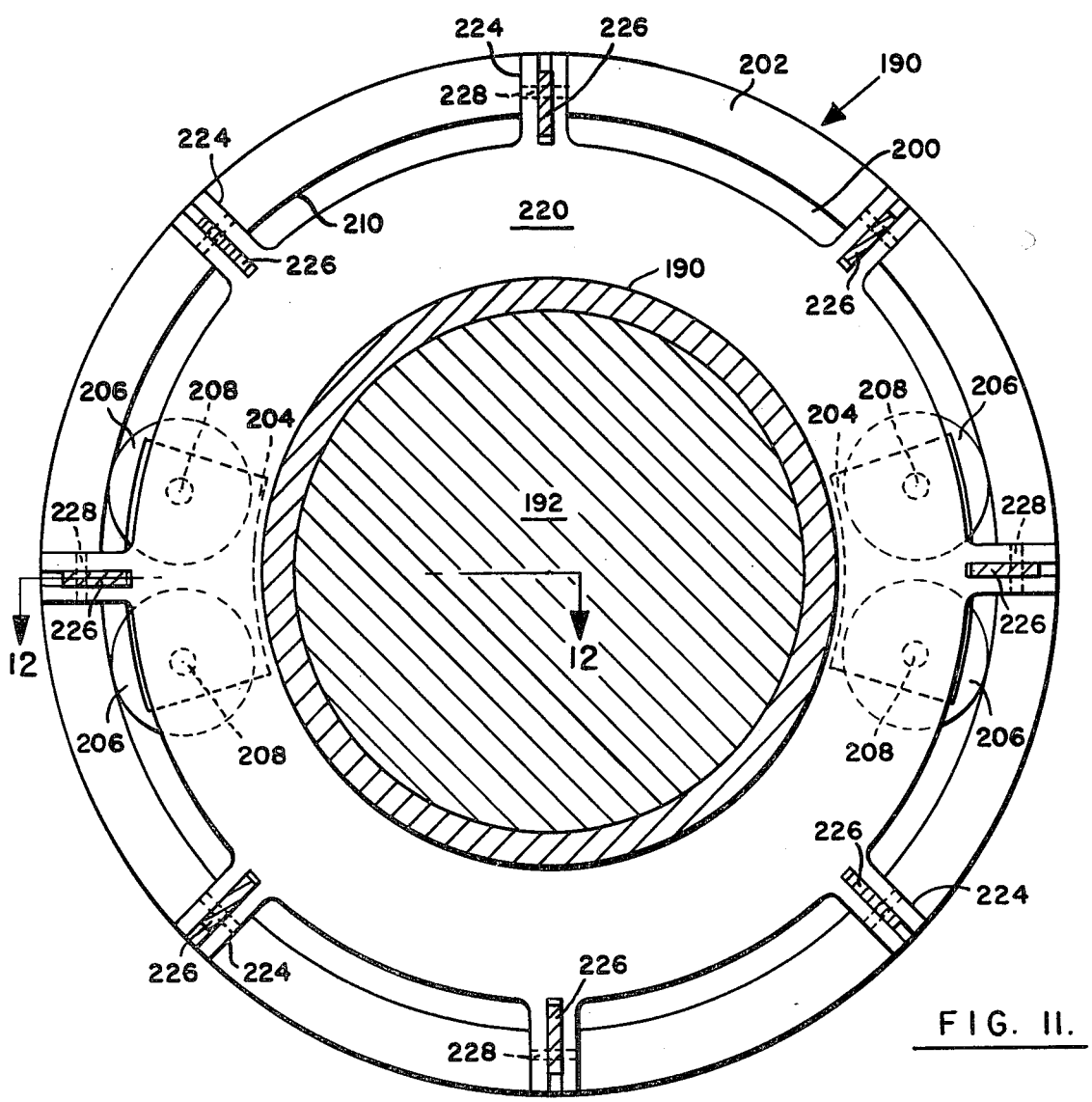
FIG. 11 is a vertical section through a rotor showing a rotor balancing device in accordance with the invention.

Another embodiment of the invention, employing centrifugal force to actuate a clutch mechanism is shown in FIGS. 11 and 12. A housing 190 is rigidly clamped to a shaft 192 by clamping sleeves 194 and 196 (FIG. 12). The housing 190 has an annulus 200 in its front face 202 in which two "U" shaped cages 204 are located, each holding two rollers 206 each turning on a shaft 208 and urged by centrifugal force against the outer face 210 of annulus 200. Two rings 214 and 216, with close clearance on the inner face 218 of the annulus 200 are placed one on the rear side and the other on the front side respectively of each cage 204, ring 216 being fastened to the left hand cage 204 and ring 214 to the right hand cage 204 as viewed in FIG. 11. The cages and the rings are held in place by plate 220 which is urged against the cages and rings by Belleville spring 222. Plate 220 has slotted bosses 224 in which are located weights 226 pivoted on pins 228 secured in bosses 224 and having a portion 230 adapted to bear on housing 190. The weights 226 are oriented with respect to the pins 228 so that centrifugal force urges the weight clockwise as seen in FIG. 12 urging portion 230 against housing 190. Reaction from this loading is transferred through pin 228 to plate 220 from which the reaction is transmitted to spring 222 relieving the force which plate 220 exerts on cages 204 and rings 214 and 216. The spring 222 exerts a force holding plate 220, cages 204 and rings 214 and 216 locked together until centrifugal force acting on weights 226 at a speed just above critical speed forces plate 220 forwardly as viewed in FIG. 11 to permit the cages 204 to move to a balancing position where they will be held when the rotor 192 drops to critical speed and spring 222 again forces plte 220 into a locking position.

Figure 13:
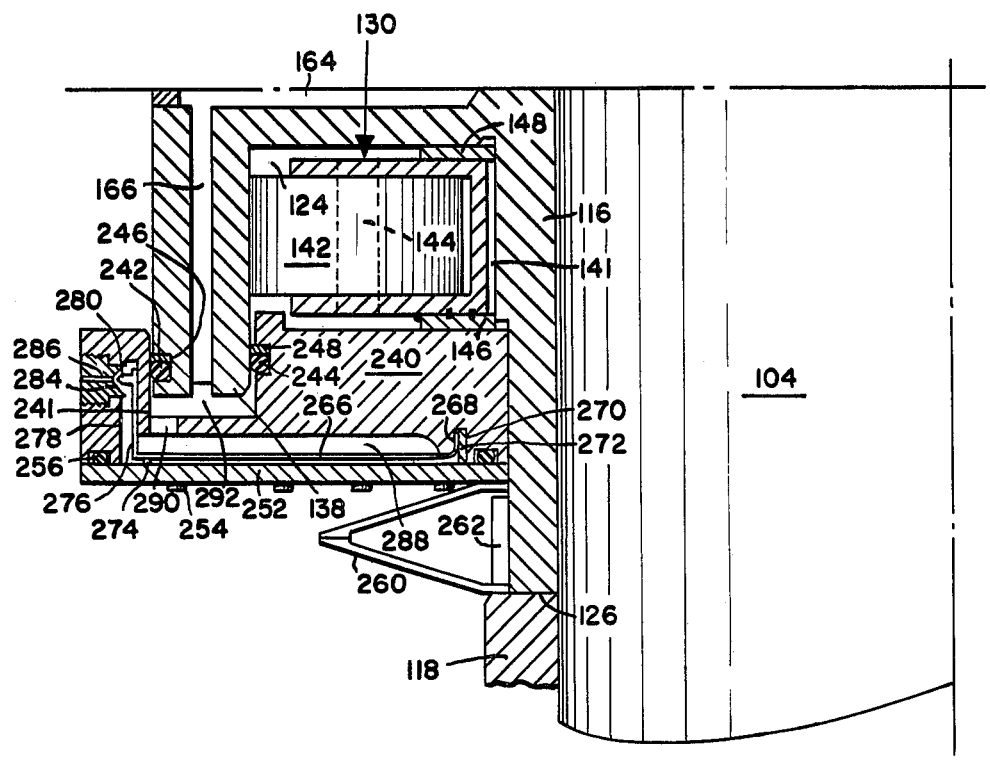
FIG. 13 is a vertical section partially broken away showing a modification of the rotor balancing device of FIG. 9.

As shown in FIG. 13, the external valve 174 of the device 102 of FIGS. 9 and 10 may be replaced by an internal valving arrangement. Plate 134 is replaced by a plate 240 which bears against ring 146 and has an annular groove 241 telescoped over annular portion 138 of housing 116. Seal rings 242 and 244 together with back up seal rings 246 and 248 respectively seal between plate 240 and annular portion 138. A cover plate 252 is secured to plate 240 by machine screws 254 and bears against a seal ring 256. A Belleville spring 260 urges cover plate 252 and plate 240 inwardly as viewed in FIG. 13 and a stop 262 limits the movement of these plates outwardly.

A strip of spring steel 266 has a finger 268 which is received in a slot 270 in plate 240 along with a finger 272 on cover plate 252. Strip 266 bears against a boss 274 on cover plate 252 adjacent strip finger 276 which rests in opening 278 in plate 240 and parallel to the axis of rotor 104. The end of finger 276 carries a valve 280 adapted to cooperate with a valve seat 284 in plate 240 to control passage 286 which connects the atmosphere to opening 278 and a space 288 between plates 240 and 252 which contains strip 266. A passage 290 connects space 288 to passage 292 which communicates with passage 166.

As the shaft speed increases, centrifugal force urges finger 276 outwardly. When the critical speed is exceeded, valve 280 is urged onto seat 284 to block the flow of oil through passage 286. Oil supplied through passages 166, 292 and 290 fills space 288 with oil and, because of the centrifugal force exerted on the oil in passage 164, pressure is created in space 288 overcoming the force of Belleville spring 260 and moving plate 240 away from ring 146 permitting cages 130 and 132 to move freely and counteract any unbalance in the rotor 104.

Advantageously, in the case of each of the balancing devices described above, at least two balancing devices will be used with one located adjacent each end bearing supporting the rotor. However, it is obvious that where the change in mass would occur close to a bearing at one end of the rotor, use of one balancing head near that end could be sufficient. This is the case with turbine shafts of some aircraft engines where the blade discs are close to one of the bearings. A change in balance caused by loss or fragmentation of a blade could be compensated for by a single device of the invention.

It will be understood that the above embodiments are illustrative and not limiting.

I claim:

1. In combination with a rotor adapted to rotate above critical speed the improvement comprising an automatic balancer for the rotor comprising:

an annular housing secured to the rotor, a pair of balancing weights on opposite sides of the center line of the rotor and mounted in the housing for movement about the axis of the rotor, speed dependent clutch means for automatically maintaining said weights locked against movement about the axis of the rotor when the rotor is rotating below critical speed and unlocked and free to move about the axis of the rotor when the rotor is rotating above critical speed.

2. The combination of claim 1 in which the weights are roller cages.

3. The combination of claim 1 in which the clutch means is spring loaded to the locked position and released by centrifugal force.

4. The combination of claim 1 in which the weights are roller cages and the clutch means comprises a spring loaded centrifugal clutch secured to each weight.

5. The combination of claim 1 in which the clutch means comprises a clutch adapted to engage both balancing weights and hydraulically actuated means for releasing the clutch responsive to the centrifugal force exerted at a rotational speed slightly above critical speed.

6. The combination of claim 1 in which the clutch means comprises a spring biased clutch adapted to engage both balancing weights and pivoted levers acting on the clutch responsive to the centrifugal force exerted at a rotational speed slightly above critical speed to release the clutch.

7. The combination of claim 1 in which the clutch means comprises a spring biased clutch adapted to engage both balancing weights and hydraulically actuated means for releasing the clutch responsive to the centrifugal force exerted at a rotational speed slightly above critical speed.

8. The combination of claim 7 in which the hydraulically actuated means includes a valve closed by centrifugal force to initiate releasing the clutch.

9. The combination of claim 8 in which the valve includes a spring strip within the housing biasing the valve open.

10. In combination with a rotor adapted to rotate above critical speed the improvement comprising an automatic balancer for the rotor comprising:

an annular housing secured to the rotor, a pair of balancing weights on opposite sides of the center line of the rotor and mounted in the housing for movement about the axis of the rotor, a pair of rings mounted in the housing concentric with the rotor with one ring secured to one weight and the other ring secured to the other weight, speed dependent clutch means for automatically locking the rings from movement about the axis of the rotor when the rotor is rotating below critical speed and releasing the rings for movement about the axis of the rotor when the rotor is rotating above critical speed.

11. The combination of claim 10 in which the clutch means comprises a spring biased clutch adapted to engage both balancing weights and hydraulically actuated means for releasing the clutch responsive to the centrifugal force exerted at a rotational speed slightly above critical speed.

12. The combination of claim 10 in which the clutch means comprises a spring biased clutch adapted to engage both balancing weights and pivoted levers acting on the clutch responsive to the centrifugal force exerted at a rotational speed slightly above critical speed to release the clutch.

13. The combination of claim 11 in which the hydraulically actuated means includes a valve closed by centrifugal force to initiate releasing the clutch.

14. The combination of claim 13 in which the valve includes a spring strip within the housing biasing the valve open.

* * * * *